Patented Nov. 11, 1930

1,781,306

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

METHOD OF PRESERVING RUBBER

No Drawing.   Application filed November 30, 1926.   Serial No. 151,825.

My invention relates to the manufacture of rubber products and it has particular reference to a method for improving the physical properties thereof.

It is universally acknowledged that vulcanized caoutchouc compositions deteriorate when exposed to air, sunlight, and moisture, and that such deterioration exhibits itself by a loss in the tensile strength, resiliency, and other desirable properties of the material. The effects accompanying the various deleterious reactions are known as "ageing", and compounds which retard or partially prevent the deterioration are termed "antioxidants".

The object of the invention resides in the provision of a class of chemical compounds which may be incorporated with rubber compositions to retard the ageing phenomena.

More specifically, the invention contemplates the employment, in rubber compositions, of the reaction products of naphthol with amines to serve as antioxidants.

The following specific compounds have been found to possess, to a marked degree, the properties of the general class, and they are illustrative of the principles of the invention.

*Example 1. Phenyl β-naphthylamine.*—This compound may be readily prepared by the reaction of β-naphthol with aniline.

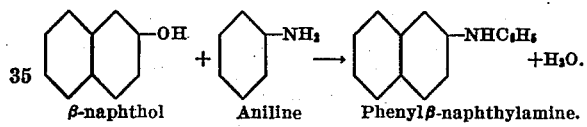

β-naphthol   Aniline   Phenyl β-naphthylamine.

One mol of β-naphthol, two mols of aniline, and one mol of fused calcium chloride are heated at a temperature of 280° C. for nine hours under pressure. The crude product is steam distilled to remove the excess aniline and it is then treated with hot alkali and washed with water. The desired product crystallizes from alcohol upon cooling as colorless plates, having a melting point between 108° and 109° C.

The product was tested in stocks of the following composition; two percent of the antioxidant, based on the rubber content, being employed in both cases.

|  | A<br>Per cent | B<br>Per cent |
|---|---|---|
| Rubber | 56.00 | 60.00 |
| Zinc oxide | 15.00 | 5.00 |
| Gas black | 23.00 | 25.00 |
| Sulphur | 1.60 | 1.80 |
| Mineral rubber | 3.20 | 5.00 |
| Diphenylguanidine | 1.20 | |
| Mercaptobenzothiazole | | 0.50 |
| Stearic acid | | 2.70 |

The results of the ageing test are indicated in Table I:

Table I

| Rubber mix | No antioxidant | | | | 2% phenyl β-naphthylamine | | | |
|---|---|---|---|---|---|---|---|---|
| | After cure | | After 12 days at 50° C. 150# O₂ | | After cure | | After 12 days at 50° C. 150# O₂ | |
| | T. | E. | T. | E. | T. | E. | T. | E. |
| A | 300 | 700% | 90 | 525% | 292 | 730% | 217 | 690% |
| B | 292 | 730% | 217 | 690% | 285 | 725% | 236 | 680% |

T. is tensile strength in kgs./cm.².
E. is percent elongation.

In all cases the compounds were cured for thirty minutes at a temperature corresponding to 40 lbs. per square inch gauge steam pressure.

*Example 2. Phenyl α-naphthylamine.*—This material may be prepared from alpha-naphthol and aniline, using the same procedure as that previously described. The product separates as practically colorless crystals having a melting point between 62° and 63° C. This material was tested in a stock having substantially the following composition, and the results are indicated in the appended Table II.

| | Parts |
|---|---|
| Rubber | 35.00 |
| Iron oxide | 1.65 |
| Lime | 1.00 |
| Magnesium oxide | 1.00 |
| Magnesium carbonate | 50.00 |
| Pine tar oil | 2.50 |
| Antioxidant | 0.30 |

Table II

| | Cure | Original | | After six days at 50° C. | | Percent of original tensile strength |
|---|---|---|---|---|---|---|
| | | Tensile strength | Elongation | Tensile strength | Elongation | |
| No antioxidant | Min. 30 / 120 | 71.6 / 73.1 | 287 / 268 | 68.2 / 49.5 | 225 / 50 | 95 / 68 |
| With phenyl α-naphthylamine | 30 / 120 | 75.7 / 79.0 | 287 / 350 | 81 / 75.8 | 268 / 275 | 108 / 98 |

Tensile strength in kgs./cm.².
Elongation in percent.

*Example 3. Diamino-diphenyl di-β-naphthyl methane.*—Two mols of beta-naphthol will react with formaldehyde in the presence of a condensing agent, such as sodium acetate, to form methylene di-β-naphthol, according to the following reaction. (Ber 39:439).

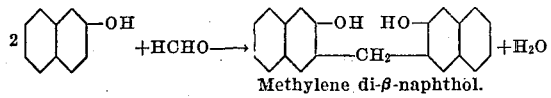
Methylene di-β-naphthol.

This product may be made to react with amines to form compounds having antioxidant properties, according to the following reaction:

$(C_{10}H_6OH)_2CH_2 + 2C_6H_5NH_2$

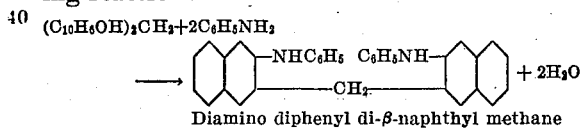
Diamino diphenyl di-β-naphthyl methane

The reacting chemicals were mixed with calcium chloride and heated in a sealed tube for seven hours at a temperature of 280° C. The mixture was then subjected to steam distillation, leaving a semi-solid substance which was fractionally distilled in vacuo, the portion going over between 160° and 210° C. crystalizing from alcohol in the form of white needles having a melting point of about 105° C. Both the crude product and the pure material were tested and found to possess substantially equal antioxidant properties.

One part of antioxidant was added to a rubber composition containing the following ingredients:

| | |
|---|---|
| Rubber—acetone extracted | 100.0 |
| Zinc oxide | 5.0 |
| Sulphur | 3.0 |
| Hexamethylene tetramine | 1.0 |
| Stearic acid | 1.5 |

The test showed results set forth in Table III.

Table III

| | Original | | After 6 days at 50° C. 150# O₂ | | Cure |
|---|---|---|---|---|---|
| | Tensile strength | Elongation | Tensile strength | Elongation | |
| No antioxidant | 155 | 855 | Melted down | | 50 min. at 40# |
| With antioxidant | 150 | 850 | 160 | 820 | 50 min. at 40# |

From the foregoing examples, it will be apparent that I have discovered a new class of materials which may be utilized to preserve rubber compositions from the deleterious effects of the elements. Obviously, other compounds than those mentioned could be employed. α-β-di-naphthylamine and β-β-di-naphthylamine have similar properties, and other aromatic hydroxy derivatives may be substituted for naphthol. In a like manner, various amines may be used in place of aniline. In view of the nature of the invention, it is not intended that the scope thereof should be limited to the specific compounds enumerated above, but only such limitations should be imposed as are set forth in the following claims.

What I claim is:

1. A method of preserving rubber which comprises incorporating the reaction product of a naphthol and an aromatic amine in a vulcanizable mixture including rubber and vulcanizing the same, said reaction product being a non-accelerator.

2. A method of preserving rubber which comprises incorporating the reaction product of a naphthol and aniline in a vulcanizable mixture including rubber and vulcanizing the same, said reaction product being a non-accelerator.

3. A vulcanized rubber product vulcanized in the presence of the reaction product of a naphthol and aniline, said reaction product being a non-accelerator of vulcanization.

4. The method of imparting age-resisting properties to rubber which comprises incorporating therewith phenyl-alpha-naphthylamine.

5. A vulcanized rubber composition having had incorporated therewith prior to vulcanization phenyl-alpha-naphthylamine.

6. A method of treating rubber which comprises vulcanizing it in the presence of a material having the following structural formula:

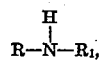

in which R represents a naphthyl group and $R_1$ an aryl group, said material being substantially a non-accelerator of vulcanization.

7. A rubber product that has been vulcanized in the presence of a material having the following structural formula:

in which R represents a naphthyl group and $R_1$ an aryl group, said material being substantially a non-accelerator of vulcanization.

8. A method of treating rubber which comprises vulcanizing it in the presence of a phenyl naphthyl amine, said amine being substantially a non-accelerator of vulcanization.

9. A rubber product that has been vulcanized in the presence of a phenyl naphthyl amine, which is a non-accelerator of vulcanization.

10. The process of producing an age-resisting rubber composition which comprises incorporating the reaction product of a primary aromatic amine with a naphthol into a rubber mix containing the usual vulcanization ingredients and heating to the vulcanization temperature.

11. The process of producing an age-resisting rubber composition which comprises incorporating the reaction product of beta-naphthol and an aromatic amine into a rubber mix containing the usual vulcanization ingredients and heating to the vulcanization temperature.

In witness whereof, I have hereunto signed my name.

JAN TEPPEMA.